US007444226B2

(12) United States Patent
Marenco

(10) Patent No.: US 7,444,226 B2
(45) Date of Patent: Oct. 28, 2008

(54) ELECTRONIC CONTROL DEVICE AND METHOD FOR CONTROLLING THE OPERATION OF MOTOR VEHICLE

(75) Inventor: Norman Marenco, Hohenaspe (DE)

(73) Assignee: Siemens Aktiengesellschaft, Munich (DE)

( * ) Notice: Subject to any disclaimer, the term of this patent is extended or adjusted under 35 U.S.C. 154(b) by 170 days.

(21) Appl. No.: 11/587,985

(22) PCT Filed: Mar. 21, 2005

(86) PCT No.: PCT/EP2005/051294

§ 371 (c)(1),
(2), (4) Date: Oct. 27, 2006

(87) PCT Pub. No.: WO2005/106229

PCT Pub. Date: Nov. 10, 2005

(65) Prior Publication Data

US 2008/0033626 A1 Feb. 7, 2008

(30) Foreign Application Priority Data

Apr. 27, 2004 (DE) ...................... 10 2004 020 538

(51) Int. Cl.
*G06F 19/00* (2006.01)
*B60K 31/00* (2006.01)

(52) U.S. Cl. .......................... 701/99; 701/22; 180/170; 318/139

(58) Field of Classification Search .................. 701/22, 701/29, 99, 102; 180/170, 178, 179; 318/139, 318/565; 324/160
See application file for complete search history.

(56) References Cited

U.S. PATENT DOCUMENTS

| | | | | |
|---|---|---|---|---|
| 4,932,246 | A | | 6/1990 | Deutsch et al. |
| 5,552,985 | A | | 9/1996 | Hori |
| 5,589,639 | A | * | 12/1996 | D'Antonio et al. ............ 73/724 |
| 5,880,568 | A | | 3/1999 | Bederna et al. |
| 6,213,259 | B1 | * | 4/2001 | Hanson et al. .............. 188/156 |
| 6,249,737 | B1 | * | 6/2001 | Zipp .......................... 701/70 |
| 6,997,299 | B2 | * | 2/2006 | Brissenden et al. ....... 192/82 R |
| 2004/0263099 | A1 | * | 12/2004 | Maslov et al. ............... 318/254 |

FOREIGN PATENT DOCUMENTS

| | | | |
|---|---|---|---|
| DE | 37 28 561 | A1 | 3/1989 |
| DE | 40 04 427 | A1 | 8/1990 |
| DE | 42 31 432 | A1 | 3/1994 |
| DE | 44 38 714 | A1 | 5/1996 |
| EP | 0 596 297 | A2 | 5/1994 |

* cited by examiner

*Primary Examiner*—John T Kwon
(74) *Attorney, Agent, or Firm*—Laurence A. Greenberg; Werner H. Stemer; Ralph E. Locher

(57) ABSTRACT

When a microcontroller, having associated output stages which are used to control components, is used, a digital release signal, in addition to the control signal, is supplied to an output stage which signals the blocking or releasing of the output stage according to the state of the signal. In the event of malfunction in the region of the microcontroller, the output stage can be disconnected. Modulation of the release signal and evaluation of the release signal which is guided to the output stage enables a malfunction in the region of the production of the release signal and/or the transmission of the release signal to be recognized using the absence of the modulation. In the event of malfunction, the output stage can disconnected in a reliable manner.

11 Claims, 2 Drawing Sheets

ELECTRONIC CONTROL DEVICE AND METHOD FOR CONTROLLING THE OPERATION OF MOTOR VEHICLE

BACKGROUND OF THE INVENTION

Field of the Invention

The present invention relates to a control device as well as to a method for controlling the operation of motor vehicle components, especially of an internal combustion engine or transmission of a motor vehicle, in accordance with the preamble of claim 1 or 8.

Such control devices and control methods are known per se (DE 40 04 427 A1, DE 42 31 432 A1, DE 44 38 714 A1) and are implemented in such systems by an electronic module usually referred to a as "control device", in which a wide variety of control and/or monitoring functions for electronic or electrical components are grouped together. The history of constantly increasing demands regarding the functionality of such control devices has led to the desired functions largely being implemented nowadays by the use of a microcontroller. The term "microcontroller" in this case refers to an electronic programmable control device, typically having a CPU, RAM, ROM and I/O ports like a PC, but unlike a PC, being designed for a very specific application.

The components to be controlled by the control device, in addition to components located in the immediate vicinity of the internal combustion engine, such as a fuel pump, a choke valve, a fuel injector or a Lambda probe, also include other components of the motor vehicle. On the input side sensor signals or measured values needed for control are entered into the control device, e.g. relating to the crankshaft speed and position, the motor temperature, the inlet air temperature and volume, the position of the gas pedal etc. This list of components to be sensed and controlled is by no means definitive and serves merely to illustrate the plurality of conceivable functions of a control device.

Since the technology of a microcontroller or its I/O ports are generally not suitable for direct activation of the motor vehicle components of interest here, these components are usually controlled by output stages assigned to them, which for this purpose receive on their input side corresponding control signals of the microcontroller and on their output side provide the voltages or currents necessary for activating and deactivating the components, for example the charge and discharge current of a piezoactuated fuel injection valve. Especially as regards the functions which are critical for safety, the output stages are usually supplied with what is referred to as a release signal in addition to the control signals, and depending on the release state, this signal is used to signal a disabling or enabling of the release. This release, independent of the actual activation output stage, is provided by a release control device which is integrated with known controllers into a monitoring device which monitors the correct operation of the microcontroller, in order to take suitable action in the case of an error, for example to reset the microcontroller and/or to set one or more release signals to the first release signal state, with which each assigned output stage is disabled or switched off.

Such a monitoring device, often referred to as a "watchdog" can in such cases be integrated into the microcontroller or can be arranged separately from this. The function of such a watchdog is for example based on this device setting tasks for the microcontroller from time to time and, on the basis of the results returned by the microcontroller, establishing whether the microcontroller is operating correctly or not.

The electrical connections which are provided for transmission of release signals to the relevant output stages (deactivation paths), can take the form of multiple (redundant) connections to provide increased safety. Furthermore the ability to deactivate output stages by means of the digital release signals can be checked on the basis of a self test in the inactive system state, i.e. at least once per usage cycle. An incorrect deviation of the operating conditions from the allowed range, especially any type of fault within the microcontroller, including errors caused by faulty software are however the most probable in the active operation of the system.

If an error occurs in the active operation of the system which should have been detected by the watchdog device, and output stages should have been switched by means of the digital release signal into a state defined as "safe", shortcomings anise in practice with the known control devices however.

In particular it can occur, in the event of an error, that a release signal is not put into a first signal state which causes the assigned output stage to be disabled, because the error is in the watchdog device itself or in its release control unit or the error adversely affects the correct function of these latter devices.

To resolve this problem of the often inadequate safety of the monitoring, it is conceivable to further increase the redundancy of the monitoring and to make it more robust in respect of errors which are caused by an overvoltage (e.g. by a short circuit). Such solutions are however expensive, under some circumstances reduce reliability in normal operation, and may in practice again be restricted to more or less specific error cases for which they are designed.

SUMMARY OF THE INVENTION

It is thus the object of the present invention to provide a control device as well as a method for controlling the operation of an internal combustion engine of a motor vehicle with improved behavior in the event of an error.

This object is achieved by a control device as claimed in claim 1 or an engine control method as claimed in claim 8. The independent claims relate to advantageous developments of the invention.

The inventive control device is characterized by a modulation device for periodic modulation of the release signal provided by the release control device and an evaluation device for analyzing the release signal supplied to the output stage with regard to the periodic modulation and for putting the output stage into a predefined error state if the periodic modulation does not occur.

By the modulation of the release signal provided by the release control device and the evaluation of the release signal fed in the direction of the output stage as regards this modulation it is ensured that an error which is present as a result of an error in the region of the release signal generation and/or release signal transmission is reliably detected (on the basis of the absence of the modulation). The output stage involved can thus reliably be placed even in such an event into a predetermined error state, which is provided for example as a deactivation state or reset state of the output stage.

In particular errors in which the release signal statically (permanently) assumes one specific state of the two release signal states can reliably and explicitly be identified as an error.

The invention thus implements a "fail-safe deactivation path" which increases the safety of the system.

In a preferred embodiment the modulation device comprises:

a pulse generator for generating a periodic sequence of modulation pulses, and a modulation stage downstream from the release control device into which the release signal from the release control device as well as the periodic sequence of modulation pulses from the pulse generator are entered and which, at least if the second release signal state is present, inverts the release signal for the duration of one modulation pulse in each case.

In this case the evaluation device can comprise an evaluation stage upstream from the output stage into which the release signal from the modulation stage is entered and which analyzes the entered release signal in respect of the presence of the inverted release signal sections in accordance with the modulation pulse sequence, and if these inverted release signal sections are present, passes the release signal on to the output stage, and if these inverted release signal sections are not present, puts the output stage into the predetermined error state.

In a preferred embodiment the evaluation device is provided in such a form, that on a transition of the entered release signal from one release signal state into the other, the release signal passed on to the output stage is only allowed to be transferred if the evaluation device can exclude the fact that the transition of the input signal has merely taken place as a result of the modulation, meaning that it was not a triggered by a corresponding transition of the release signal provided by the release signal device. This checking by the evaluation device before a changeover of the release signal state output requires a certain amount of time under some circumstances which in practice however is often acceptable. Alternatively this checking by the evaluation device associated as a rule with a delay is only provided if the release signal changes over from the first into the second or from the second into the first release signal state.

Preferably the evaluation device is embodied such that the modulation of the entered release signal is removed, i.e. the release signal output to the output stage contains no such modulation. It is also conceivable however to leave the modulation in the release signal if in the timing of the signal relatively short-duration modulation sections did not significantly adversely affect the activation of the output stage involved or if the modulation is filtered out in the output stage.

The pulse generator can be provided integrated together with the modulation stage, e.g. in the watchdog device, that is especially together with the other circuit parts of the watchdog device in a common integrated circuit which may if necessary also include the microcontroller.

Preferably the release control device is integrated into a monitoring device (such as for example watchdog mentioned at the start), which monitors the correct operation of the microcontroller and only provides the release signal in the second release signal state on determining correct operation. In many applications, if for example a commercially-available microcontroller chip is to be used, it is of advantage to provide the monitoring device including the release control device and including at least a part of the modulation device (e.g. without the pulse generator described below) in a common integrated circuit which is arranged separately from the microcontroller chip in an electronic module (control device).

Preferably the evaluation device is integrated into the output stage device containing the output stage, that is especially embodied in a common integrated circuit. Quite apart from the advantage of a low-cost implementation of the evaluation device, e.g. without additional electronic components, a further, quite significant advantage is produced from this in practice in connection with an overvoltage monitoring or in connection with the “fail-safe” behavior of the system as a whole in the specific error case of an overvoltage.

This advantage requires a more detailed explanation:

Any behavior of the electronic components used in the control device can only be guaranteed within a restricted technology-related operating range. As soon as this range is left, e.g. if impermissibly high voltages are present at any point of the system, any given configuration of the release signals is conceivable.

If the monitoring device exceeds a certain complexity it is economically sensible in practice to embody this device in a different technology from the output stages which generally involve power output stages, namely expediently in a low-voltage technology (such as the microcontroller for example).

If this monitoring device now assumes the task of overvoltage detection, since the precision required for this cannot generally be achieved in the power output stages to be deactivated, the case can arise that the permitted voltage range of the monitoring device is exceeded even if the output stage is still operating within its allowed range, so that a transition into the desired predetermined error case state can no longer be guaranteed.

If however the evaluation device possesses a greater dielectric strength than the microcontroller or those circuit parts of the control device which are necessary to provide the release signal, meaning that the evaluation device is for example integrated into an output stage device containing the output stage with relatively high dielectric strength, the overvoltage-related failure in the region of the microcontroller of the monitoring device or the release control device can still be reliably detected as long as the overvoltage does not cause a failure of the output stage device. The latter is however easy to guarantee by the corresponding dimensioning of the dielectric strength of the output stage which in practice in any event must be designed at least for the on-board network voltage of the motor vehicle plus a specific safety reserve.

The modulation of the release signal used in accordance with the invention should adversely affect the normal operation of the system as little as possible. In this regard it is advantageous for the period of the modulation to be prespecified such that this is selected to be at most as great as an error reaction time specified for the monitoring device, preferably less than this error reaction time. Periods of less than 100 ms are for example as a rule well suited to control devices for the internal combustion engine and/or the transmission of a motor vehicle. It is also of advantage for the pulse duty ratio of the modulation to be less than 10%, e.g. in the order of magnitude of 1%. If, as already mentioned above, the release signal from the release control device is inverted or interrupted in each case for the duration of one modulation pulse, the pulse duration should be selected to be comparatively small in relation to the period and the period itself should also be short enough for the application involved, taking into account all tolerances within predetermined error reaction times, to guarantee a reaction of the evaluation unit in the event of an error.

If the evaluation device has detected an absence of the modulation and thus an error, then for example a release signal which is in the first release signal state is output to the subsequent output stage or the subsequent output stages in order to disable an activation of the controlled components (at least for as long as the modulation is absent and/or at least for a predetermined period of time). Depending on the type of the component control it is however not basically excluded for the error state in which the output stage is to be placed simply to consist of releasing the activation. The decisive point is that in the event of an error which is detected by the absence of the modulation the output stage involved is put into a predetermined error case state. Even if with most output stages the obvious choice is to put the release signal permanently into a defined state for this purpose, it is possible as an alternative or in addition to explicitly influence the state of the output stage in another way, e.g. by any type of error case signal such as for example a reset signal which is provided for the output stage involved. Finally, on detection of an error case, this can also be notified to other circuit parts of the control device, especially to the microcontroller and/or the power supply unit with reset functions which, when the control device is started up, reset or start the individual device components in a defined manner.

BRIEF DESCRIPTION OF THE DRAWINGS

The invention is explained in more detail below on the basis of an exemplary embodiment with reference to the enclosed drawings. The Figures show.

DESCRIPTION OF THE PREFERRED EMBODIMENTS

Figure 1:
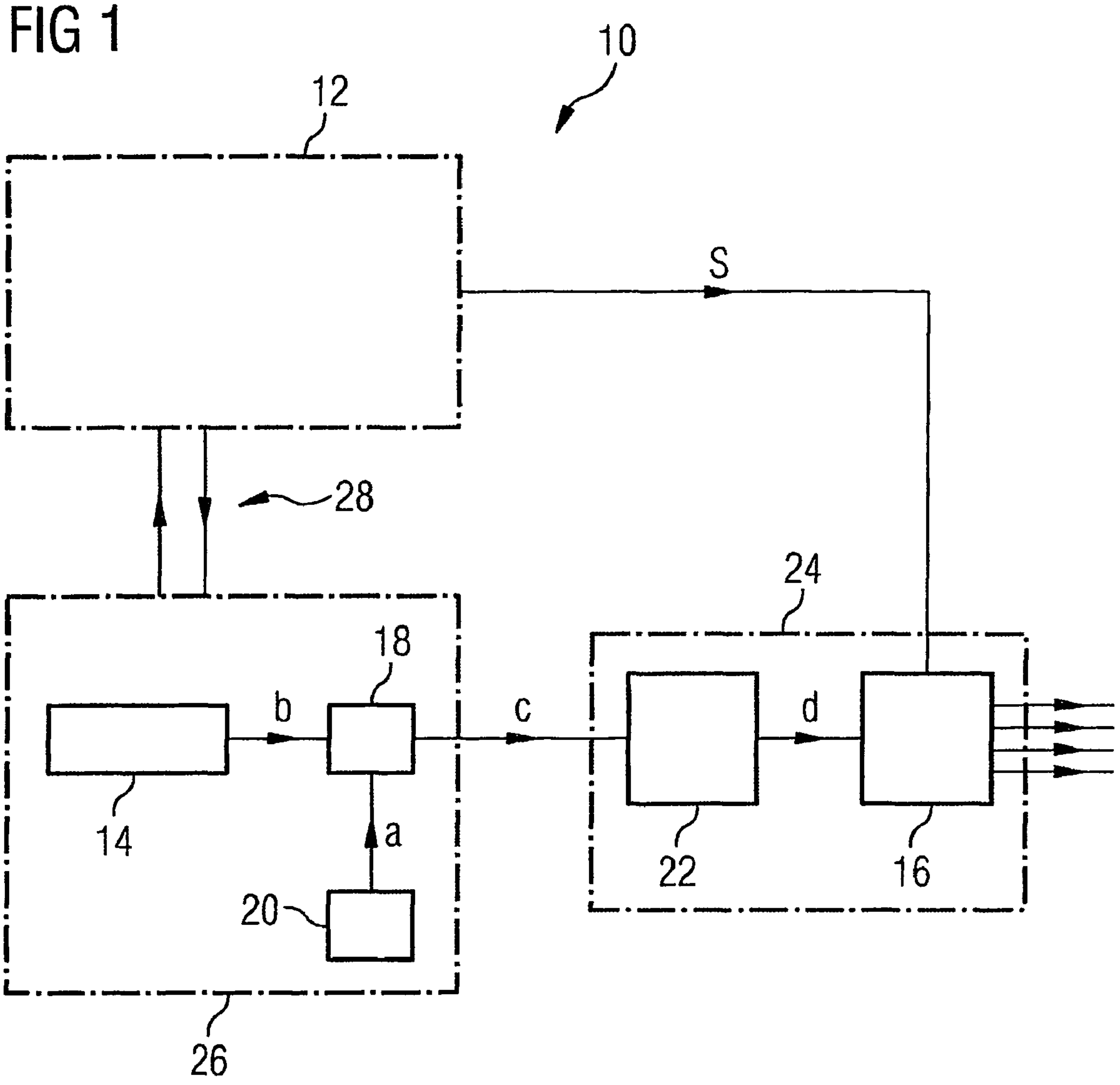
FIG. 1 is a schematic block diagram of an engine control device for controlling the operation of a fuel-injected engine of a motor vehicle.

FIG. 1 shows major components of an engine control device identified as a unit by the number 10 for a direct-injection engine of a motor vehicle, comprising a microcontroller 12 for provision of a control signal S for control of the fuel-injection system in the operation of the internal combustion engine not shown, a release unit 14 for provision of a digital release signal b, by means of which through a first logical release signal "Low" (L) a disabling and through a second logical release signal "High" (H) an enabling of the activation of the fuel injection system is signaled, and an output stage 16 for activating and deactivating the component, to be controlled, in this case the fuel-injection system, based on the control signal S, taking into account a release signal d entered into this output stage 16. with conventional engine control devices the release signal b output by the release unit 14 is entered directly into the output stage 16 or the signals b and d are identical. This is not the case with the control device 10 shown, as is described again below.

The output 16 initiates a fuel injection by outputting corresponding activation signals AS to the various fuel injectors (the signal lines shown on the right-hand edge of FIG. 1 symbolize the activation of four fuel injectors) only if the release signal d entered into the output stage 16 is in the H state. The injection timing and the injection amounts are in this case essentially defined by the control signal S output by the microcontroller 12. To simplify the diagram the transmission of the control signal S is only symbolized here by a line. This connection can actually be embodied as a more complicated line arrangement depending on the output stage to be activated. Furthermore the diagram in FIG. 1 omits all parts of the circuit of the control device 10 which are not of any significance for understanding the invention and can be arranged in a conventional manner (e.g. power supply(ies), input signals the microcontroller for accepting various sensor signals which are needed as part of the vehicle component control or engine control).

One special feature of the control device 10 shown lies in its generation, transmission and use of a particular release signal and will be explained below with reference to an output stage 16 for a motor vehicle fuel injection system, which is merely to be taken as an example. Naturally the engine control device 10 in practice features further output stages for control of further motor vehicle components, for which the methods of an especially "safe" release signal described below can also be used.

A modulation device formed from a modulation stage 18 and a pulse generator 20 is connected directly downstream from the release unit 14 and takes care of periodic modulation of the release signal b provided by the release control device. If a number of release devices like the release device 14 shown are provided, in a monitoring device for example, a common pulse generator can advantageously be used for modulating the individual release signals.

Figure 2:
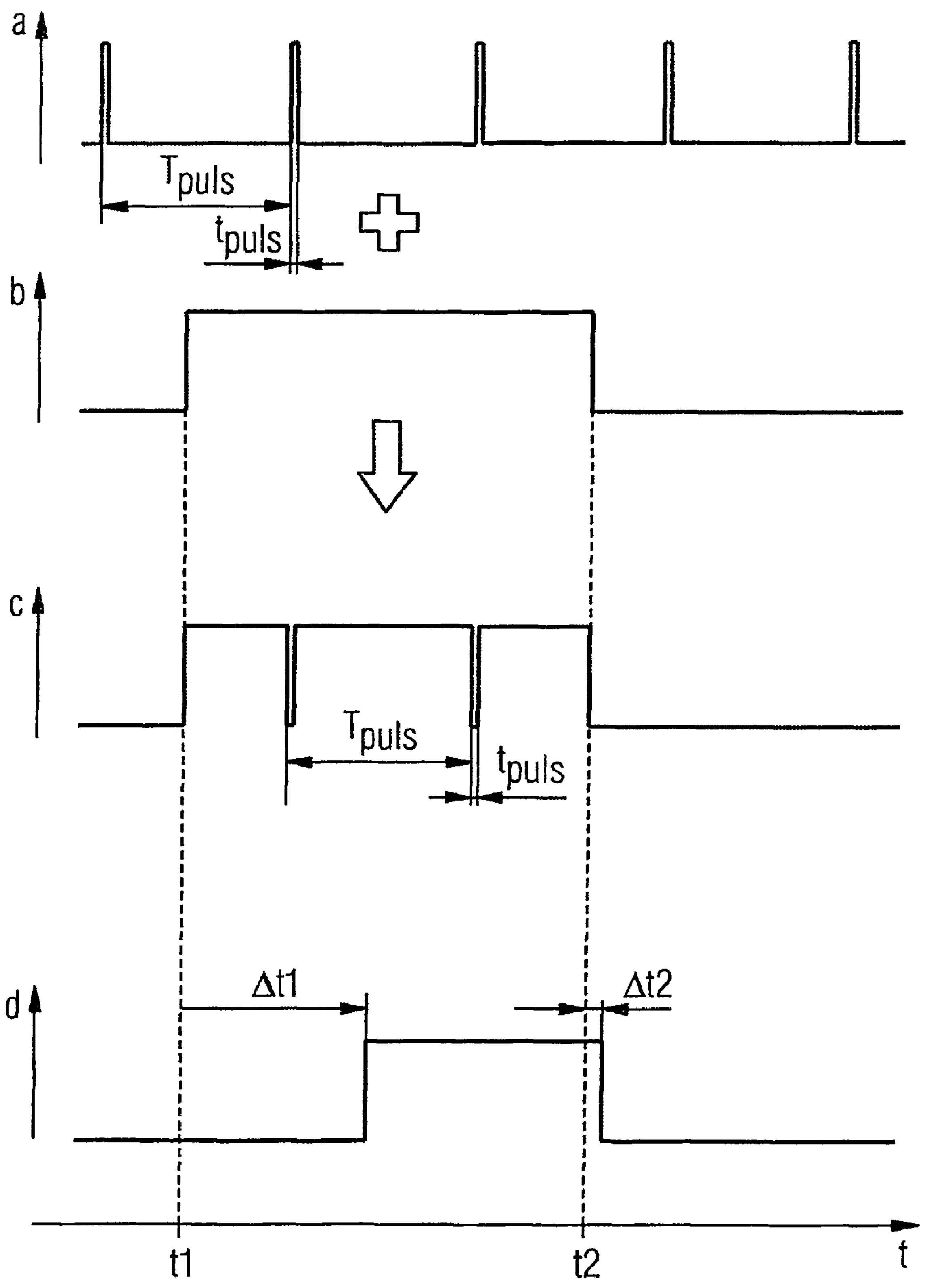
FIG. 2 is a diagram of the timing sequence of various signals occurring in the engine control device depicted in FIG. 1.

The topmost (first) waveform shown in FIG. 2 represents the modulation pulse signal generated by the pulse generator 20. This signal consists of a periodic sequence of rectangular modulation pulses with a period of Tpuls and a pulse duration of tpuls.

The second waveform shown in FIG. 2 presents a typical example of a release signal b output by the release unit 14 which changes at an end time t1 from L to H and at an end time t2 back to L again.

These signals a and b are entered into the modulation stage 18 so that a "modulated" release signal c is formed from them for which the waveform is also shown in FIG. 2. It can be seen from this diagram that in the modulation stage 18 the H state, which signals the release of the activation of the fuel injection system, is periodically interrupted by a comparatively short modulation pulses during which the signal c to a certain extent signals the disabling of the injection system activation. In the example shown this periodic modulation merely takes place in signal sections in which the signal b is in the H state.

The output stage 16 is immediately preceded in the circuit by an evaluation stage 22 which is implemented in the same technology (here on the same chip) as the output stage 16 and along with this stage forms an output stage device 24.

The release signal c input into the evaluation stage 22 is analyzed by the evaluation unit 22 with regard to the presence of the periodic modulation signal c, expressed in simple terms it is only forwarded to the output stage 16 as a release signal d if the modulation is detected in the input signal c. By contrast the evaluation stage 22 interprets an absence of the modulation as an error and then puts the output stage 16 into a previously defined error case state. In the exemplary embodiment shown this is done by permanently outputting the release signal d in the L state, and doing this regardless of the state of signal c. This means that in the example shown fuel injection is forcibly ended even independently of control signal S.

The waveform shown at the bottom of FIG. 2 represents the release signal d forwarded to the output stage 16 when the system is operating correctly. It can be seen from this waveform that the signal transition from L to H occurring at point in time t1 (in signal c) is not forwarded immediately to the output stage (in signal d) but only after a fixed entry delay At1 has elapsed. This is because the evaluation unit 22 in the example shown initially excludes the case in which this transition would have been caused by a "static" error in signal c (or in the transmission line provided for this signal). To this end the system waits for the period At1 in order to detect the arrival of a modulation pulse. Only if this pulse is actually detected does the evaluation unit also let the signal d change over to the H state. At1 in this case is slightly larger than the pulse period Tpuls and is of a fixed duration.

In a similar manner the transition in signal c from H to L occurring at point in time t2 is not reflected directly in output signal d, but only after a certain delay (fall delay At2). This is because the evaluation stage 22 in the previous example initially excludes the case in which this transition is merely caused by the arrival of a modulation pulse. Accordingly it waits for the period At2. Only if the signal c does not change back to H within this period does the evaluation stage 22 let the signal d change over to L. This fall delay At2 is also fixed here and is slightly bigger than the pulse width tpuls.

The pulse period Tpuls, the pulse width tpuls and the "filter times" At1, At2 are to be selected to suit the relevant system requirements. The pulse duty ratio (tpuls/Tpuls) should be as small as possible in most application cases e.g. smaller than 10%, especially smaller than 1%. In respect of short error reaction times of the evaluation stage 22 on the other hand a period Tpuls which is as short as possible is advantageous. In the example shown for fuel injection a Tpuls of the order of magnitude of around 10 ms is typically conceivable.

The evaluation stage 22 can for example cause an H state (enable) or L state (disable) of the signal d on the basis of specific criteria:

- The signal c is in the H state and a first modulation pulse of full length (pulse width tpuls) is then detected. (->enable)
- The signal c is longer than the maximum pulse width to be expected in the L state. (->disable)
- the signal c is in the H state and 80 modulation pulse is absent within double the period Tpuls to be expected. (->disable)
- The signal c has an undefined level. This can be caused for example by an undervoltage in the range of the release signal generation. (->disable)

For most applications it is preferable to assign priority to the transition to L (disable) over the transition to H (enable).

In a conceivable further development there can be provision for the evaluation stage 22, on detection of pulses in the signal, to also check the intervals between consecutive pulses to ensure that this tallies with the predetermined modulation period. This enables the correct modulation pulse sequence to be distinguished more precisely from of a pulse sequence generated by an error for example.

In a manner known per se the release unit 14 is contained in a monitoring device which communicates via a communications link 28 with the microcontroller 12 in order in particular to monitor the correct operation of the latter, and depending on the result of this monitoring, to set the release signal b accordingly for example.

In the example shown the evaluation stage 22, as a result of its microelectronic integration into the region of the output stage device 24, has a relatively high dielectric strength by comparison with the microcontroller 12 and/or the monitoring device 26 in technology terms (e.g. 36V). The evaluation stage 22 can thus advantageously also initiate error case measures, especially disabling or deactivating the output stage 16, if parts of the circuit of the control device 10 which are involved in the provision of the release signal are adversely affected or destroyed by an overvoltage. Because of the modulation the fail-safe behavior of the system as a whole is therefore not only especially reliable but to an extent is autonomous, as far as a failure caused by an overvoltage of logic components such as the microcontroller is concerned. The additional logic in the output stage device 24 leads to an automatic permanent deactivation of the output stage 16 as soon as a static state of the deactivation path is detected which is transferring the signal c. In the solution described the dynamic required only needs to be generated in error-free system operations so that a restricted operating mode is made possible if only the deactivation path is incorrect, but not the control logic however. In the event of an error the output stage behaves under the critical operating conditions in the manner specified for it.

Advantageously the release or deactivation signal is safeguarded from the control of a signal driver in the release control device through to the reading out of this signal by an input comparator of a power output stage (i.e. completely from one IC to another IC for example). Only the function itself within the power output stage (in the event of an error) is to be ensured. The inventive solution covers any basic cause of an incorrect deactivation path. For implementation, additional, especially discrete additional components, are not necessarily required, which is favorable as regards cost and mean time between failures. The effectiveness of the security in operation can be guaranteed continuously if certain logic functions can remain usable provided only one deactivation line is defective. The inventive solution can be realized on the part of the monitoring device or of a monitoring module to be upwards-compatible to conventional output stages (if necessary with slight modification measures). A return from an impermissible into a permissible operating range of the monitoring device does not change anything in the effectiveness of the inventive deactivation as regards the deactivation path.

In summary, in the control of the operation of an internal combustion engine using a microcontroller with assigned output stages to control engine components, in addition to the actual control signal, a digital release signal is also supplied to an output stage, by means of which, depending on the signal state, a disabling or enabling of the output stage is signaled. This means that the output stage can be deactivated in the event of an error in the region of the microcontroller. By modulating the release signal and evaluating of the release signal fed through to the output stage ensures that an error in the region of the release signal generation and/or release signal transmission can be detected on the basis of the absence of the modulation and the output stage can be very reliably deactivated in the event of an error.

I claim:

1. An electronic control device for controlling the operation of motor vehicle components, comprising

- a microcontroller for providing at least one control signal for control of at least one component to be controlled in an operation of the motor vehicle;
- a monitoring device connected for monitoring a correct operation of said microcontroller,
- a release control device configured to output a digital release signal, for signaling:
  - a disabling with a first release signal state, if said monitoring device establishes that said microcontroller is not operating correctly; or
  - an enabling of an activation of the component to be controlled with a second release signal state, if said monitoring device establishes that said microcontroller is operating correctly;
- an output stage for activating and deactivating the component to be controlled based on the control signal and taking into account the release signal state;
- a modulation device connected to said release control device for periodic modulation of the release signal; and
- an evaluation device connected to receive and to analyze the release signal fed to said output stage with regard to the periodic modulation, and connected to place said output stage into a predetermined error case state if the periodic modulation is absent.

2. The control device according to claim 1 configured for controlling at least one component of an internal combustion engine or a transmission of the motor vehicle.

3. The control device according to claim 1, wherein said modulation device comprises:

a pulse generator for generating a periodic sequence of modulation pulses; and a modulation stage connected to an output of said release control device, said modulation stage receiving the release signal of said release control device and the periodic sequence of modulation pulses from said pulse generator, said modulation stage being configured to invert the release signal for a duration of a modulation pulse in each case, at least if the second release signal state is present;

wherein said evaluation device is embodied as an evaluation stage connected upstream from said output stage, receives the release signal from said modulation stage and analyzes the input release signal with regard to a presence of the release signal pulse sections inverted in accordance with the modulation pulse sequence and, if the inverted release signal sections are present, forwards the release signal to said output stage and if the inverted release signal sections are absent, places the output stage into the predetermined error case state.

4. The control device according to claim 1, wherein said release control device is integrated into said monitoring device.

5. The control device according to claim 1, wherein said evaluation device is integrated into an output device containing said output stage.

6. The control device according to claim 5, wherein said evaluation device has a greater dielectric strength than at least one of said monitoring device and said microcontroller.

7. The control device according to claim 1, wherein a period of the modulation is predetermined so as to be no greater than an error reaction time specified for said monitoring device.

8. The control device according to claim 1, wherein a period of the modulation is selected smaller than an error reaction time specified for said monitoring device.

9. The control device according to claim 1, wherein a pulse duty ratio of the modulation is less than 10%.

10. A method of controlling an operation of a motor vehicle component by way of a control device, the control device comprising:

a microcontroller for generating at least of one control signal for control of at least one component to be controlled in the operation of the motor vehicle;

a monitoring device for monitoring a correct operation of the microcontroller;

a release control device for outputting a digital release signal, by way of which:

if the monitoring device establishes that the microcontroller is not operating correctly, a first release signal state signals a disabling of the activation of the component to be controlled; and if the monitoring device establishes that the microcontroller is operating correctly, a second release signal state signals an enabling of the activation of the component to be controlled; and an output stage for activating and deactivating the component to be controlled based on the control signal, taking into account the release signal; and the method which comprises:

subjecting the release signal provided by the release control device to periodic modulation;

analyzing the release signal fed to the output stage in respect of the periodic modulation; and placing the output stage into a predetermined error case state if the periodic modulation is absent.

11. The method according to claim 10, which comprises controlling a component of an internal combustion engine or of a transmission of a motor vehicle.

* * * * *